(No Model.)
B. YOCH.
MINING MACHINE.
No. 563,000.
Patented June 30, 1896.
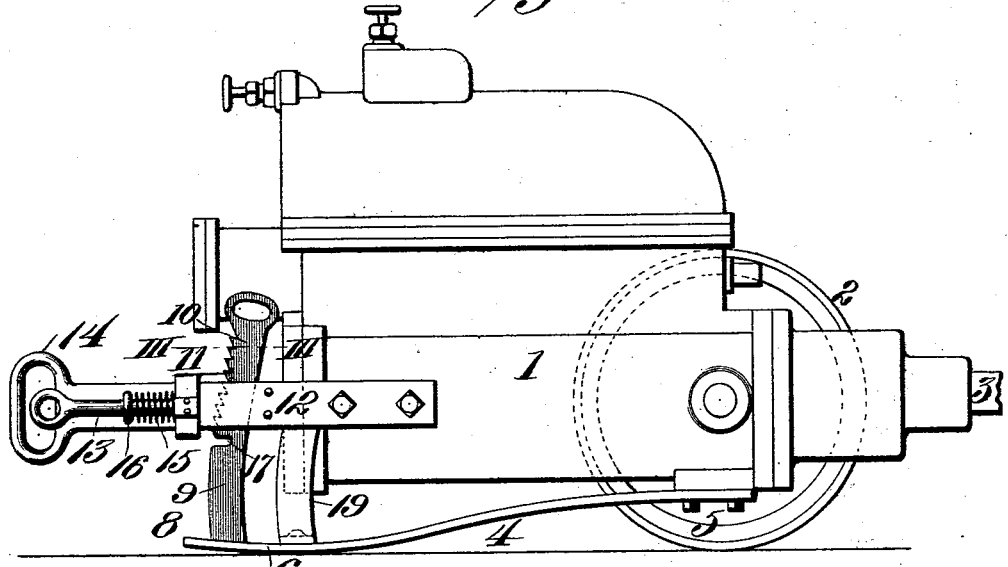
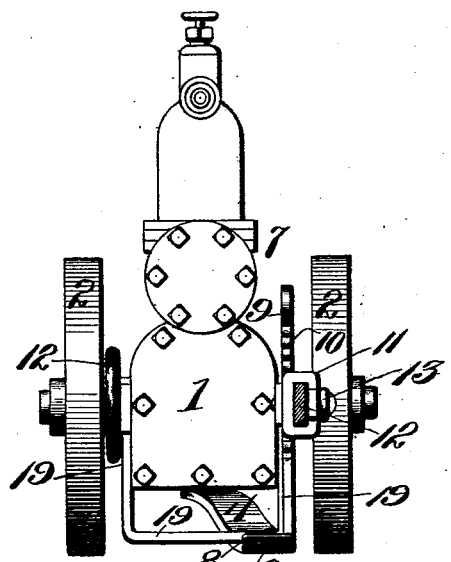
Attest:
E. S. Knight
H. Finley
Inventor:
Bernhard Yoch.
By Knight Bro'
Att'ys.

UNITED STATES PATENT OFFICE.

BENHARD YOCH, OF BELLEVILLE, ILLINOIS.

MINING-MACHINE.

SPECIFICATION forming part of Letters Patent No. 563,000, dated June 30, 1896.

Application filed March 8, 1895. Serial No. 541,055. (No model.)

*To all whom it may concern:*

Be it known that I, BENHARD YOCH, of Belleville, in the county of St. Clair, in the State of Illinois, have invented a certain new and useful Improvement in Mining-Machines, of which the following is a full, clear, and exact description, reference being had to the accompanying drawings, forming part of this specification.

My invention relates to a third support for a two-wheeled mining-machine, the construction being such that a provision is made for holding the body of the machine in different horizontal positions, so as to change the line of movement of the pick.

My invention consists in features of novelty hereinafter fully described, and pointed out in the claims.

Figure I is a side elevation of a mining-machine provided with my improvement. Fig. II is an end view with one of the handles in section. Fig. III is an enlarged detail view with the ratchet-bar in section on line III III, Fig. I.

Referring to the drawings, 1 represents the body of the machine, and 2 the supporting-wheels.

3 represents the piston-rod, which carries the pick or tool, as usual.

4 represents a spring-shoe secured to the body of the machine at 5, and adapted to normally bear against the ground or against the support upon which the machine rests, as shown at 6, the extreme end of the shoe being curved slightly upward, as shown at 8, so that in the backward movement of the machine the shoe will not catch in the ground or support. The free end of the shoe has a tendency to spring downward, so that it will always bear at 6 against the ground or the support upon which the machine rests, except when it is manually raised, as hereinafter stated. This shoe provides a third support for the machine, keeping the body of the machine from oscillating while at work, and to provide for an adjustment in the horizontal position of the body of the machine and thereby change the angle at which the tool works, I secure to the shoe 4 a ratchet-bar 9, having teeth 10 engaged by a dog 11, mounted so as to slide on one of the handles 12 of the machine. The dog can be pulled out of engagement with the teeth 10 by a handle 13, having a finger-loop 14, and the dog is held into engagement with the teeth, when not pulled back, by a spring 15 surrounding the handle 13 between the dog and a guide-lug 16 on the handle 12. As there is more weight behind the supporting-wheels 2 than forward of them, it will be seen that the angle of the body of the machine can be changed at will and maintained at its adjustment by causing the dog 11 to engage the ratchet-bar 9 higher up or lower down, and when it is desired to move the machine from one place to another (at which time the operator carries the rear end of the machine by taking hold of the handles 12) the dog 11 is made to engage an elongated notch 17 in the bar 9, so that the spring-shoe 4 will be raised off the ground and will not interfere with the movement of the machine.

The bar 9 is held against the handle 12 by a clip 18, (see Fig. III,) and to still further prevent lateral movement or strain on the shoe I secure an arm 19 thereto that extends up on the far side of the body of the machine, as shown in Fig. II.

As shown, I prefer to secure the shoe to the body of the machine at a point beneath the journal-line of the supporting-wheels, so that when the body of the machine is oscillated in a vertical plane it has a minimum tendency to raise the free end of the shoe from the ground or wheel-support.

I claim as my invention—

1. In a mining-machine having a single pair of supporting-wheels, a shoe connected to the front part of the machine and adapted to normally bear against the machine-support while the body of the machine is oscillated in a vertical plane and suitable means for oscillating the body substantially as set forth.

2. In combination with a mining-machine having a single pair of supporting-wheels, a spring-shoe connected to the front part of the machine and adapted to normally bear upon the machine-support and forming a third support back of said wheels, substantially as set forth.

3. In combination with a mining-machine having a single pair of supporting-wheels, a shoe connected to the front part of the machine approximately beneath the journal-points of said wheels, and a bar-and-ratchet connection between the body of the machine and the shoe, said shoe being adapted normally to bear against the machine-support while the body of the machine is oscillated in a vertical plane; substantially as set forth.

4. In combination with a mining-machine having a single pair of supporting-wheels, a spring-shoe connected to the front part of the machine and extending back of said wheels, a ratchet-bar secured to the free end of said shoe, and a movable dog mounted on one of the handles of the machine and adapted to engage said ratchet-bar, substantially as set forth.

5. In combination with a mining-machine having a single pair of supporting-wheels, a shoe connected to the front part of the machine approximately beneath the journal-points of said wheels, and which is adapted normally to bear against the machine-support while the body of the machine is oscillated in a vertical plane, and suitable means for oscillating the body substantially as set forth.

6. In a mining-machine having a single pair of supporting-wheels, the combination of a spring-plate connected to the front part of the machine, a ratchet-bar secured to said plate and having an elongated notch 17, and a dog secured to one of the handles of the machine and adapted to engage said ratchet-bar and said notch, substantially as and for the purpose set forth.

7. In combination with a mining-machine having a single pair of supporting-wheels, a shoe 4 connected to the front part of the machine, a ratchet-bar secured to the free end of the shoe, a guide-plate 19 secured to the shoe, and a dog secured to one of the handles of the machine and adapted to engage said ratchet-bar, substantially as set forth.

BENHARD YOCH.

In presence of—
STANLEY STONER,
N. FINLEY.